US012776083B2

(12) United States Patent
Zeng et al.

(10) Patent No.: US 12,776,083 B2
(45) Date of Patent: Oct. 27, 2026

(54) STICKER GENERATION METHOD AND DEVICE

(71) Applicant: Lemon Inc., Grand Cayman (KY)

(72) Inventors: Weihong Zeng, Beijing (CN); Xu Wang, Beijing (CN); Jing Liu, Los Angeles, CA (US); Shen Sang, Los Angeles, CA (US); Haishan Liu, Beijing (CN)

(73) Assignee: Lemon Inc., Grand Cayman (KY)

( * ) Notice: Subject to any disclaimer, the term of this patent is extended or adjusted under 35 U.S.C. 154(b) by 21 days.

(21) Appl. No.: 18/839,310

(22) PCT Filed: Feb. 13, 2023

(86) PCT No.: PCT/SG2023/050075
§ 371 (c)(1),
(2) Date: Aug. 16, 2024

(87) PCT Pub. No.: WO2023/158375
PCT Pub. Date: Aug. 24, 2023

(65) Prior Publication Data

US 2025/0157116 A1 May 15, 2025

(30) Foreign Application Priority Data

Feb. 16, 2022 (CN) ........................ 202210141293.X

(51) Int. Cl.
*G06T 13/40* (2011.01)
*G06T 11/60* (2026.01)

(52) U.S. Cl.
CPC .............. *G06T 13/40* (2013.01); *G06T 11/60* (2013.01)

(58) Field of Classification Search
CPC . G06T 11/60; G06T 13/80; G06T 7/73; G06T 13/40; G06F 16/58; G06F 16/5866
See application file for complete search history.

(56) References Cited

U.S. PATENT DOCUMENTS

| | | | |
|---|---|---|---|
| 6,115,053 | A | 9/2000 | Perlin |
| 10,659,405 | B1 | 5/2020 | Chang et al. |

(Continued)

FOREIGN PATENT DOCUMENTS

| | | | |
|---|---|---|---|
| CN | 1570967 | A | 1/2005 |
| CN | 102270352 | B | 12/2016 |

(Continued)

OTHER PUBLICATIONS

International Patent Application No. PCT/SG2023/050075; Int'l Written Opinion and Search Report; dated Sep. 20, 2023; 9 pages.

(Continued)

*Primary Examiner* — Michelle Chin
(74) *Attorney, Agent, or Firm* — BakerHostetler

(57) ABSTRACT

Embodiments of the invention provides a sticker generation method and device, an electronic device, a computer readable storage medium, a computer program product and a computer program. The method comprises: obtaining a material image of a target component on an avatar, the target component being in motion in a sticker comprising the avatar; determining a global position of the target component according to the material image; determining a periodic motion amplitude of the target component in the sticker; generating the sticker according to the material image, the global position, and the periodic motion amplitude. Therefore, a dynamic effect of components in the sticker is achieved, a user does not need to master a specific software and use complex skills to perform vertex layout and movement, and a specific model file does not need to be involved. Thus, the sticker making difficulty is reduced, the sticker making efficiency is improved, and better user experience is achieved.

20 Claims, 5 Drawing Sheets

(56) References Cited

U.S. PATENT DOCUMENTS

| | | | |
|---|---|---|---|
| 2006/0074292 | A1 | 4/2006 | Thomson et al. |
| 2008/0012864 | A1 | 1/2008 | Nakahashi |
| 2008/0039713 | A1 * | 2/2008 | Thomson ............. A61B 6/5217 382/294 |
| 2008/0137952 | A1 | 6/2008 | Kokemohr |
| 2017/0221272 | A1 * | 8/2017 | Li ......................... G06T 19/006 |
| 2019/0265792 | A1 * | 8/2019 | Wu .................... G02B 27/0172 |
| 2020/0358725 | A1 * | 11/2020 | Scapel .................... H04L 51/08 |
| 2021/0299439 | A1 * | 9/2021 | Shamir ................. G06T 7/0012 |
| 2021/0405182 | A1 * | 12/2021 | Reynolds ................ G01S 13/90 |

FOREIGN PATENT DOCUMENTS

| | | | |
|---|---|---|---|
| CN | 107180446 | A | 9/2017 |
| CN | 107924579 | A | 4/2018 |
| CN | 108765527 | A | 11/2018 |
| CN | 110520901 | A | 11/2019 |
| CN | 110782515 | A | 2/2020 |
| CN | 112150594 | A | 12/2020 |
| CN | 112562050 | A | 3/2021 |
| CN | 112634416 | A | 4/2021 |
| CN | 113538628 | A | 10/2021 |
| EP | 2579214 | A1 | 4/2013 |
| JP | 2001-216525 | A | 8/2001 |
| JP | 2002-157605 | A | 5/2002 |
| KR | 2020-0134623 | A | 12/2020 |

OTHER PUBLICATIONS

China Patent Application No. 202210141293.X; Office Action; dated Mar. 28, 2026; 14 pages.

China Patent Application No. 202210141293.X; Notification To Grant; Aug. 17, 2026; 6 pages.

* cited by examiner

| | |
|---|---|
| • FOREGROUND (THERE MAY BE MULTIPLE LAYERS WITH EACH LAYER BEING A png) | • FOREGROUND_1, FOREGROUND_2, ... |
| • HAIR | |
| ◦ HAIR DECORATION (THERE MAY BE MULTIPLE LAYERS WITH EACH LAYER BEING A png) | • HAIR DECORATION_1, HAIR DECORATION_2, ... |
| ◦ FRONT HAIR (THERE MAY BE MULTIPLE LAYERS WITH EACH LAYER BEING A png) | • FRONT HAIR_1, FRONT HAIR_2, ... |
| ◦ FRONT EAR HAIR (THERE MAY BE MULTIPLE LAYERS WITH EACH LAYER BEING A png) | • FRONT EAR HAIR_1,FRONT EAR HAIR_2, ... |
| ◦ REAR EAR HAIR (THERE MAY BE MULTIPLE LAYERS WITH EACH LAYER BEING A png) | • REAR EAR HAIR_1, REAR EAR HAIR_2, ... |
| ◦ REAR HAIR (THERE MAY BE MULTIPLE LAYERS WITH EACH LAYER BEING A png) | • REAR HAIR_1, REAR HAIR_2, ... |
| • HEAD | |
| ◦ HEAD DECORATION (THERE MAY BE MULTIPLE LAYERS WITH EACH LAYER BEING A png) | • HEAD DECORATION_1, HEAD DECORATION_2, ... |
| ◦ EYEBROW (ALL LAYERS ARE MERGED TO A png UNDER THE CATEGORY) | • EYEBROW_1 |
| ◦ EYES | |
| ▪ UPPER EYELASH (ALL LAYERS ARE MERGED TO A png UNDER THE CATEGORY) | • UPPER EYELASH_1 |
| ▪ LOWER EYELASH (ALL LAYERS ARE MERGED TO A png UNDER THE CATEGORY) | • LOWER EYELASH_1 |
| ▪ PUPIL (ALL LAYERS ARE MERGED TO A png UNDER THE CATEGORY) | • PUPIL_1 |
| ▪ EYE WHITE (ALL LAYERS ARE MERGED TO A png UNDER THE CATEGORY) | • EYE WHITE_1 |
| ◦ NOSE (ALL LAYERS ARE MERGED TO A png UNDER THE CATEGORY) | • NOSE_1 |
| ◦ MOUTH (ALL LAYERS ARE MERGED TO A png UNDER THE CATEGORY) | • MOUTH_1 |
| ◦ FACE (ALL LAYERS ARE MERGED TO A png UNDER THE CATEGORY) | • FACE_1 |
| ◦ EAR (ALL LAYERS ARE MERGED TO A png UNDER THE CATEGORY) | • EAR_1 |
| • BODY (THERE MAY BE MULTIPLE LAYERS WITH EACH LAYER BEING A png) | • BODY_1, BODY_2, ... |
| • BACKGROUND (THERE MAY BE MULTIPLE LAYERS WITH EACH LAYER BEING A png) | • BACKGROUND_1, BACKGROUND_2, ... |

FIG. 3b

STICKER GENERATION METHOD AND DEVICE

CROSS REFERENCE OF RELEVANT APPLICATION

The present application is the U.S. National Stage of International Application No. PCT/SG2023/050075, filed on Feb. 13, 2023, which claims priority to Chinese Patent Application No. 202210141293.X, filed before the State Intellectual Property Office of The People's Republic of China on Feb. 16, 2022 and entitled "Sticker Generation Method And Device", which [is] are incorporated herein by reference their entireties.

TECHNICAL FIELD

Embodiments of the present disclosure relates to the technical field of computers, and in particular to a sticker generation method and device, an electronic device, a computer readable storage medium, a computer program product, and a computer program.

BACKGROUND

Stickers presented by means of static images, dynamic images and so forth are vivid and strongly interesting, and enjoy great popularity among users. Besides stickers used in chatting, making stickers also becomes some users' favorite.

In dynamic stickers, it is the most difficult to draw the dynamic effects of some components, e.g., the hair flowing effect and the body breathing effect. At present, the dynamic effects of a component may be generated by means of live2d (a drawing rendering technique) driving. However, a person who draws shall master specific software and use complicated techniques for vertex layout and movement in the manner, setting a high technical threshold requirement for the person who draws. As an alternative, the hair flowing effect and the body breathing effect on the basis of a physical engine may also be designed. However, in the manner, different specific model files need to be made, thereby leading to complicated making processes and high difficulty.

Therefore, how to reduce the difficulty in making dynamic effects of a component in the stickers is a problem that needs to be solved.

SUMMARY

Embodiments of the present disclosure provide a sticker generation method and device, an electronic device, a computer readable storage medium, a computer program product, and a computer program.

In a first aspect, the embodiments of the present disclosure provide a sticker generation method, comprising: obtaining a material image of a target component on an avatar, the target component being in motion in a sticker comprising the avatar; determining the global position of the target component according to the material image; determining a periodic motion amplitude of the target component in the sticker; generating the sticker according to the material image, the global position, and the periodic motion amplitude.

In a second aspect, the embodiments of the present disclosure provide a sticker generation device, comprising: an acquisition unit for obtaining a material image of a target component on an avatar, the target component being in motion in a sticker of the avatar; a position determining unit for determining a global position of the target component according to the material image; an amplitude determining unit for determining a periodic motion amplitude of the target component in the sticker; a generation unit for generating the sticker according to the material image, the global position, and the periodic motion amplitude.

In a third aspect, the embodiments of the present disclosure provide an electronic device, comprising: at least one processor and a memory; the memory storing a computer executive instruction; the at least one processor executing the computer executive instruction stored by the memory such that the at least one processor executes the sticker generation method as claimed in the first aspect or various possible designs of the first aspect above.

In a fourth aspect, the embodiments of the present disclosure provide a computer readable storage medium, the computer readable storage medium storing a computer executive instruction therein, and implementing the sticker generation method as claimed in the first aspect or various possible designs of the first aspect above when a processor executes the computer executive instruction.

In a fifth aspect, the embodiments of the present disclosure provide a computer program product, the computer program product comprising a computer executive instruction, and implementing the sticker generation method as claimed in the first aspect or various possible designs of the first aspect above when a processor executes the computer executive instruction.

In a sixth aspect, the embodiments of the present disclosure provide a computer program, implementing the sticker generation method as claimed in the first aspect or various possible designs of the first aspect above when a processor executes the computer program.

Through the sticker generation method and device, the electronic device, the computer readable storage medium, the computer program product, and the computer program provided in the embodiments, a material image of a target component on an avatar is acquired, the target component being in motion in a sticker comprising the avatar; a global position of the target component is determined according to the material image; a periodic motion amplitude of the target component in the sticker is determined; the sticker is generated according to the material image, the global position, and the periodic motion amplitude.

BRIEF DESCRIPTION OF THE DRAWINGS

In order to more clearly illustrate the technical solutions in the embodiments of the present disclosure or in the existing technologies, the accompanying drawings to be used in the embodiments or the existing technologies will be briefly introduced below. It is obvious that the accompanying drawings described below are some embodiments of the present disclosure. For those skilled in the art, other accompanying drawings may be obtained based on these drawings without involving any creative efforts.

FIG. 3*b* is a schematic diagram of component classification and component naming;

DETAILED DESCRIPTION

Figure 1:
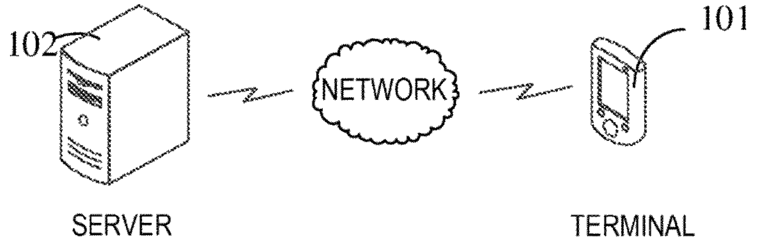
FIG. 1 is a schematic diagram of an application scenario provided by the embodiments of the present disclosure.

In order to make the objects, technical solutions and advantages of the embodiments of the present disclosure clearer, the technical solutions in the embodiments of the present disclosure will be described clearly and completely below in conjunction with the accompanying drawings in the embodiments of the present disclosure. It is obvious that the described embodiments are only some of the embodiments of the present disclosure, rather than all of them. Based on the embodiments of the present disclosure, all other embodiments obtained by those skilled in the art without involving any creative efforts should fall within the scope of protection of the present disclosure.

First, the terms involved in the embodiments of the present disclosure are explained as follows:

(1) Avatar: a virtual character such as cartoon character depicted by an image in a computing device.

(2) A component in an avatar: It is a constituent part in an avatar. For example, eyes, a nose, a mouth, and so forth of a cartoon character are components of the cartoon character.

(3) A material image of a component: a layer where the component is drawn, wherein different components may correspond to different material images, that is, different components may correspond to different layers so as to improve the flexibility of component combinations.

(4) Global position of a component: the image position of the component within a expression image in the sticker, wherein the expression image includes an avatar acquired by combining a plurality of components.

Second, the concept of the embodiments of the present disclosure is provided as follows:

A sticker generally needs to be drawn frame by frame and synthesized by those persons with drawing skills, wherein it is most difficult to draw the dynamic effects such as hair flowing effect and body breathing effect of a component on the avatar. In the relevant techniques, professionals draw the dynamic effects by using the live2d based driving manner. However, a high technical threshold is brought to this method since a complicated technique shall be utilized for vertex layout and movement. In addition, the dynamic effects of a component may be drawn on the basis of a physical engine. However, a specific model file shall be designed, thereby leading to a complicated making process.

For solving the problem above, the embodiments of the present disclosure provide a sticker generation method and device in order to overcome the problem, namely, high difficulty in making the dynamic effects of a component in the sticker. In the embodiments of the present disclosure, a material image of a target component on the avatar is acquired, the target component being a component in motion in the sticker, the global position of the target component and a periodic motion amplitude of the target component in the sticker are determined, and a sticker is generated according to the material image, the global position, and the periodic motion amplitude. Therefore, the dynamic effects of a component in the sticker are implemented through the processes above, where it is not necessary for a user to grasp specific software and use complicated skills for vertex layout and movement, and it is not necessary to involve a specific model file, either. Accordingly, the dynamic effects of the periodic motion of a component is implemented in the sticker, and only material images of a plurality of components on the avatar shall be prepared by the user during the whole process, which reduces the difficulty in making a sticker, improves the making efficiency, and improves the user's experience of making a sticker.

With reference to FIG. 1, FIG. 1 is a schematic diagram of an application scenario provided by the embodiments of the present disclosure.

As shown in FIG. 1, the application scenario is a scenario of making a dynamic sticker. In this scenario, a user may prepare material images of a plurality of components on the avatar on a terminal 101 where a dynamic sticker is made on the basis of the material images of a plurality of components. As an alternative, with the terminal 101, the material images of the plurality of components may be sent to a sever 102 through which, a dynamic sticker is made on the basis of the material images of the plurality of components.

Exemplarily, in the chatting scenario, if a user intends to make a unique and interesting dynamic sticker, he/she may click the sticker making page provided by a chatting application on the terminal. On the sticker making page, the user may input material images of a plurality of components of some avatars such as cartoon animals and cartoon characters designed by the user, or may input material images of a plurality of components of some avatars such as cartoon animals and cartoon characters authorized in public, thereby obtaining a ready-made sticker through the sticker making procedure.

The sticker generation method and device provided in the embodiments of the present disclosure are described in conjunction with the application scenario illustrated in FIG. 1 below. It should be noted that the application scenario above is only illustrated for facilitating understanding of the spirt and principles of the present disclosure. The embodiments of the present disclosure are not restricted in this aspect. In contrary, the embodiments of the present disclosure may be applied in any applicable scenario.

It should be noted that the embodiments of the present disclosure may be applied in an electronic device which may be a terminal or server, wherein the terminal may be a personal digital assistant (PDA for short) device, a handheld device with a wireless communication function (e.g., a smartphone and a tablet), a computing device (e.g., a personal computer (PC for short)), a vehicle-mounted device, a wearable device (e.g., a smart watch and a smart bracelet), a smart home device (e.g., a smart display device), and so forth. Among them, the server may be an integral server or a distributed server across a plurality of computers or computer data centers. The server may also be various, e.g., but not limited to, a web server, an application server, a database server, or a proxy server.

Figure 2:
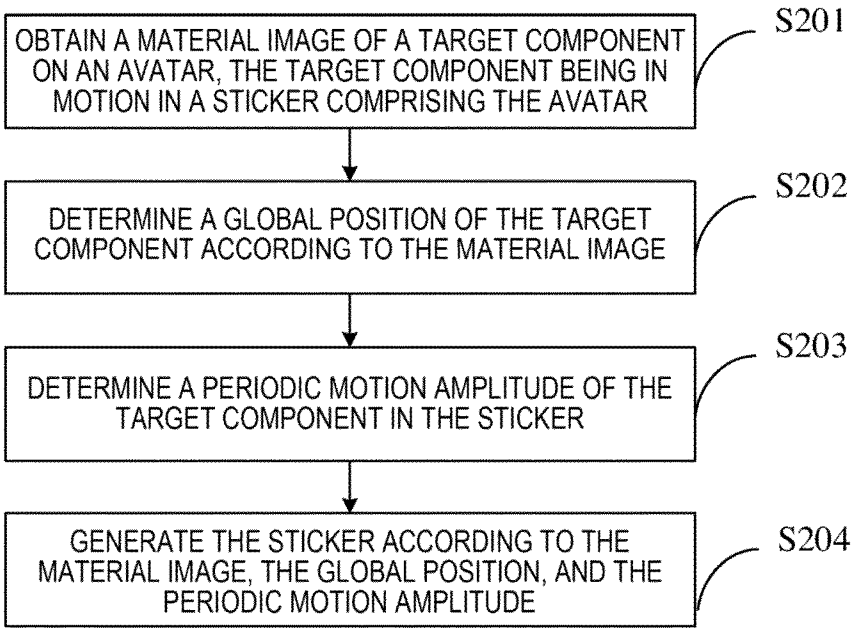
FIG. 2 is a schematic flow diagram I of a sticker generation method provided by the embodiments of the present disclosure.

With reference to FIG. 2, FIG. 2 is a schematic flow diagram I of a sticker generation method provided by the embodiments of the present disclosure. As illustrated in FIG. 2, the sticker generation method includes:

Step S201: obtaining a material image of a target component on an avatar, the target component being in motion in a sticker comprising the avatar.

In the embodiments, a material image of one or more target components inputted by a user may be acquired. For example, the user may input a material image of a target component through an input control of a sticker making page. For another example, the user may display material images of components of a plurality of avatars on the sticker making page, and the user may select a material image of a target component of the same avatar therefrom. Among them, besides the target components, the user may also input material images of other components on an avatar so as to improve the integrity of the avatar.

In order to enhance the authenticity of a sticker, the upper body of an avatar will fluctuate up and down with the breath, and the hair will also present a hair flowing effect. Thus, a body component and a hair component of the avatar are in motion in the sticker. Hence, optionally, the target component includes a body component and/or a hair component of the avatar, wherein there may be one or more hair components.

Step S202: determining a global position of the target component according to the material image of the target component.

In the embodiments, when there are a plurality of target components, the material images of different target components have a consistent size, and the positions of the target components in the material images reflect the global positions of the target components. Therefore, the global positions of the target components may be acquired by determining the positions of the target components in the material images. Accordingly, the accuracy of the global positions of the target components is improved by means of determining the global positions of the target components in an expression image with the material images having a consistent size and the positions of the target components in the material images.

Step S203: determining the periodic motion amplitude of the target component in the sticker.

Among them, as the dynamic sticker is equivalent to a video, a plurality of expression images in the sticker are equivalent to a plurality of video frames in the video. The sticker has a certain duration, and the dynamic effects of the target component in the sticker may be implemented through a periodic motion of the target component in the duration such that the dynamic effects of the target component in the sticker are more natural. For example, the upper body of an avatar is periodically fluctuating up and down with the breath, and the hair of the avatar periodically flows. Therefore, when the target component includes a body component and/a hair component, the periodic motion amplitude of the body component and/or the hair component in the sticker can be determined so as to control the periodic motion of the components on the basis of the periodic motion amplitudes of respective components.

Among them, the periodic motion amplitude of a target component in the sticker includes a motion amplitude of the target component on the timeline of the sticker at a plurality of moments. The motion amplitude at a plurality of moments periodically varies. For example, the periodic motion amplitude of the target component is in a chronological order as follows: 0, 1, 2, 3, 2, 1, and 0.

Among them, considering that the global positions of different target components are possibly different, and different target components have different patterns, the periodic motion amplitudes of different target components in the sticker may be different so as to generate more accurate and more reasonable effects of the motion of the target component.

In the embodiments, the periodic motion amplitude of a target component is determined on the basis of the law of the periodic motion of the target component in the sticker, thereby obtaining the periodic motion amplitude of the target component.

Step S204: generating a sticker according to the material image, the global position, and the periodic motion amplitude.

In the embodiments, as the periodic motion amplitude of the target component includes a motion amplitude of the target component at a plurality of moments, the image positions of the target component in the expression image at respective moments may be determined on the basis of the global position of the target component and the periodic motion amplitude of the target component, and motion of the material image of the target component to the positions of these image positions is controlled, thereby implementing the dynamic effect of the target component in the sticker.

In addition, as for remaining components except the target components on the avatar, if the motion postures of the remaining components vary as the facial expressions vary, for example, the corners of the mouth gradually bend upward when a person is smiling, stickers may also be generated by combining the material image, global positions, and postures of the remaining components. For example, the postures of the remaining components at respective moments are determined, and the material images of the remaining components are combined on the basis of the global positions of the remaining components and the postures thereof at respective moments so as to acquire an expression image at respective moments.

It should be noted that only generation of the dynamic effects of a target component in the sticker (e.g., the dynamic effect of the up-down fluctuation of the upper body with the breath, the dynamic effect of the left-right hair flowing, the dynamic effect of the left-right swinging of bowknots, and so forth), not changes in the postures of the components (e.g., changes in the shapes of eyebrows and corners of a mouth under different facial expressions), are concerned in the respective embodiments of the present disclosure. Therefore, how to determine postures of a component at different moments and under different facial expressions is not specifically described in the respective embodiments of the present disclosure, and is not limited, either.

In the embodiments of the present disclosure, the material image of a target component on an avatar is acquired; the target component is a component in motion in the sticker; the global position of the target component and the periodic motion amplitude of the target component in the sticker are determined; and the sticker is generated according to the material image, the global position, and the periodic motion amplitude. Accordingly, the dynamic effects of the periodic motion of a component are implemented in the sticker, and during the whole process, the user shall only prepare material images of a plurality of components on the avatar, thereby reducing the difficulty in making the sticker, and in particular reducing the difficulty in drawing the dynamic effects of some components in the sticker, effectively improving the efficiency in making the sticker, and improving the user's experience of making a sticker.

On the basis of the embodiments provided in FIG. 2, a plurality of feasible extended embodiments are provided below:

(1) Regarding an Avatar

In some embodiments, an avatar includes a virtual character image and a cartoon character image in particular. As compared with other types of stickers, it is quite difficult to make a sticker of the cartoon character image, and a 2D image is generally required to draw a 3D dynamic effect. In the embodiments, a user may acquire a dynamic sticker of the cartoon character image by inputting the material images of a plurality of components on the cartoon character image, thereby improving the efficiency of making the dynamic sticker of the cartoon character image, and reducing the making difficulty.

Further, when the avatar is a virtual character image, the target component includes a body component and/or a hair component, and the number of hair component(s) is greater than or equal to 1.

(2) Regarding Components

In some embodiments, essential components and non-essential components are pre-arranged.

Among them, the essential components are components essential for making stickers of an avatar, while the non-essential components are optional components for making stickers of the avatar. When inputting material images of a plurality of components, a user must input the material images of all essential components so as to ensure the integrity of an avatar in the stickers.

Accordingly, the success rate of making stickers and the effects of making the stickers are improved by distinguishing the components into essential components and non-essential components. Of course, in addition to inputting of material images of essential components, the user may also input material images of non-essential components so as to further improve and enrich avatars.

Among them, the target component may be an essential component, and may also be a non-essential component.

Optionally, when the avatar is a cartoon character image, the essential components may include an eyebrow component, an upper eyelash component, a pupil component, a mouth component and a face component, wherein the appearance of the cartoon character image may be depicted accurately, and a plurality of emotions may also be expressed vividly through these components, which is beneficial to ensuring the integrity of the avatar and improving the vividness of facial expressions of the avatar.

Optionally, the non-essential components may include at least one as follows: a foreground component, a hair component, a head decoration component, a lower eyelash component, an eye white component, a nose component, an ear component, a body component, and a background component. Thus, the avatar becomes more detailed through these non-essential components.

Among them, the foreground component is a component located in front of an avatar according to the spatial relationship.

In some embodiments, the types of a plurality of components are preset. Before material images of target components on the avatar are acquired, the types of a plurality of components may be displayed. Accordingly, it is convenient for a user to input the material image of a component according to the type of the component, wherein the type of the component may be divided into the types of a plurality of layers. When the type of a component is divided into two layers, the type of the component may be divided into a parent class and a subclass under the parent class.

Optionally, the parent class includes at least one as follows: a foreground component, a hair component, a head component, a body component, and a background component. The subclass of the hair component includes at least one as follows: a head decoration component, a front hair component, a front ear hair component, a rear ear hair component, and rear hair; the subclass of the head component includes a head decoration component, an eyebrow component, an eye component, a nose component, a mouth component, a face component, an ear component.

Further, the subclass may be further divided into different types. Specifically, the subclass of the eye component may include at least one as follows: an upper eyelash component, a lower eyelash component, a pupil component, and an eye white component.

Figure 3A:
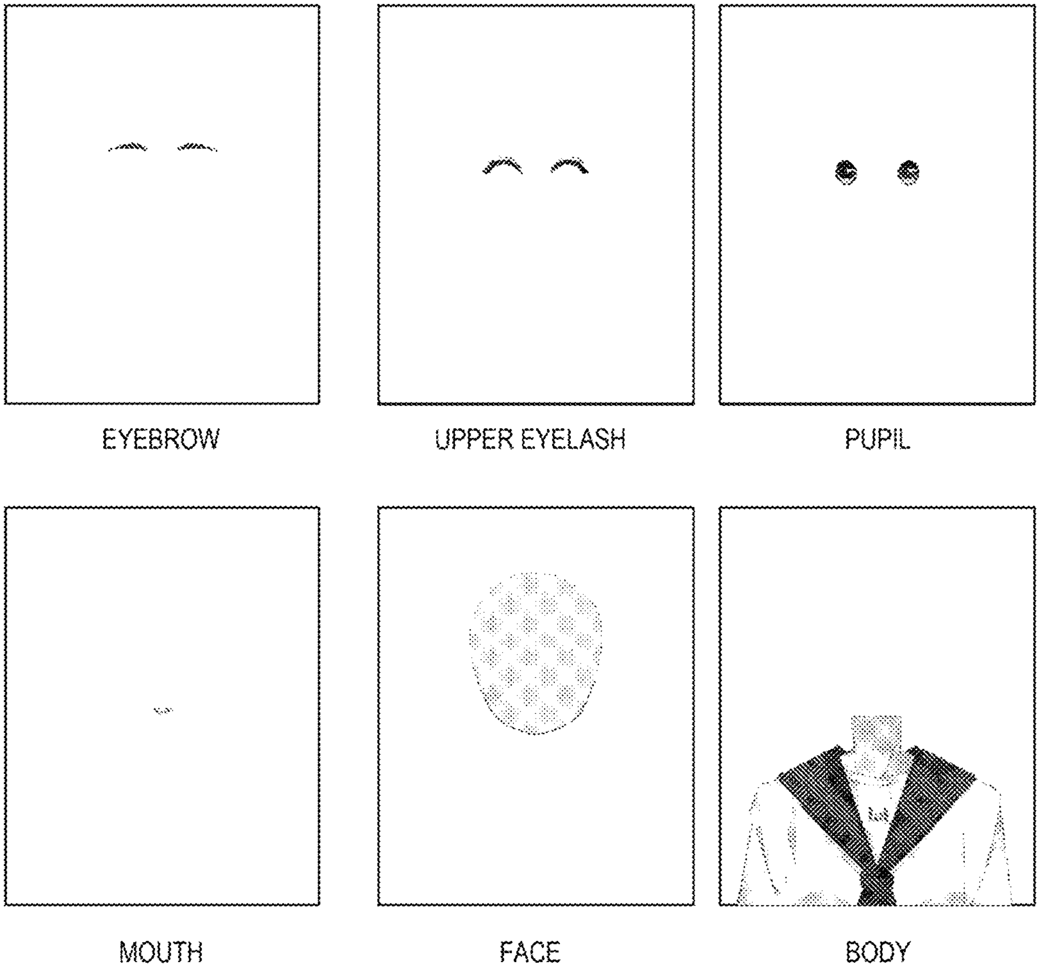
FIG. 3*a* is a schematic diagram of material images of a plurality of components.

As an example, as illustrated in FIG. 3*a*, FIG. 3*a* is a schematic diagram of material images of a plurality of components. In FIG. 3*a*, the material images corresponding to such components as eyebrow component, upper eyelash component, pupil component, mouth component, face component, and body component of a cartoon character image are provided. It can be seen that these material images have a consistent size. The corresponding cartoon character image can be obtained by combining and splicing material images of these components.

(3) Regarding Material Images

In some embodiments, a component may correspond to one or more material images. For example, an avatar has a plurality of head decoration components which may correspond to a plurality of material images.

In some embodiments, a material image corresponds to the only image identification. That is, different material images correspond to different image identifications. Accordingly, during the process of generating a sticker according to the material images of components, the material images may be distinguished and components corresponding to the material images may be distinguished through an image identification.

Optionally, the image identification includes an image name.

For example, the image names of a plurality of material images corresponding to the foreground component are as follows: foreground 1, foreground 2, . . . ; the image names of a plurality of material images corresponding to the hair decoration component are as follows: hair decoration component 1, hair decoration component 2, . . . , etc.

As an example, as illustrated in FIG. 3*b*, FIG. 3*b* is a schematic diagram of component classification and component naming, wherein a plurality of components are displayed in the left region, and the naming method of material images of the types of a plurality of components is displayed in the right region. "A layer" refers to a material image, and "png" is an image format of the material image.

It can be seen from FIG. 3*b* that 1) "foreground" may correspond to a plurality of layers, the images may be named as follows: foreground_1, foreground_2, and so forth; 2) "hair decoration" may correspond to a plurality of layers, and the images may be named as follows: hair decoration_1, hair decoration_2 and so forth; 3) "front hair" may correspond to a plurality of layers, and the images may be named as follows: front hair_1, front hair_2, and so forth; 4) "front ear hair" may correspond to a plurality of layers, and the images may be named as follows front ear hair_1, front ear hair_2, and so forth; 5) "rear hair" may correspond to a plurality of layers, and the images may be named as follows: rear hair_1, rear hair_2, and so forth; 6) "head decoration" may correspond to a plurality of layers, and the images may be named as follows: head decoration_1, head decoration_2, and so forth; 7) "eyebrow" may correspond to a plurality of layers, and a plurality of layers may be merged into a png, that is, a plurality of material images may be merged into a material image, and the images may be named as follows: eyebrow_1; . . . . In this way, different names may be provided to the material images of different types of components, and different names may be provided to different material images of the same type of component. No more details will be given here.

(4) Regarding Determination of a Global Position

In some embodiments, a possible implementing mode of the Step S202 includes: determining an external matrix of a target component in the material image of the target component; determining the global position of the target component according to the external matrix of the target component. Accordingly, the accuracy of the global position of the target component is improved by solving the external matrix of the target component in the material image of the target component.

In the implementing mode, the external matrix of the target component may be identified in the material image of the target component so to acquire the position of the external matrix of the target component in the material image. Among them, the position of the external matrix in the material image includes a pixel point coordinate of four vertexes of the external matrix in the material image. Afterwards, as the material images of all components have a consistent size, and the image position of a target component in the material image reflects the global position of the target component, it can be determined that the global position of the target component is the position of the external matrix of the target component.

Optionally, the image channel of the material image of the target component includes a position channel.

Among them, in the material image, the channel value of a pixel point in the position channel reflects whether the pixel point is located in the image region of the target component. For example, if the channel value of the pixel point in the position channel is 1, it is determined that the pixel point is located in the image region; if the channel value of the pixel point in the position channel is 0, it is determined that the pixel point is not located in the image region. Therefore, the external matrix of the target component in the material image may be determined through the values of a plurality of pixel points in the position channel in the material image, thereby improving the accuracy of the external matrix.

Further, the material image of the target component is a RGBA four-channel image. That is, the image channels of the material image of the target component include channel R, channel G, channel B, and channel A, wherein the channel R, channel G, and channel B are red, green, and blue channels of an image, and channel A is the position channel of the image.

Therefore, the channel values of respective pixel points in channel A may be acquired in the material image of the target component, and the external matrix of the target component may be determined according to the channel values of respective pixel pints in channel A. For example, all pixel points whose channel value in the channel A is 0 are determined in the material image of the target component, and the external matrix comprising these pixel points is determined as an external matrix of the target component.

Further, the external matrix of the target component may also be a minimum bounding rectangle (MBR) of the target component so as to improve the accuracy of the global position of the target component.

(5) Regarding Determination of the Periodic Motion Amplitude

Figure 4:
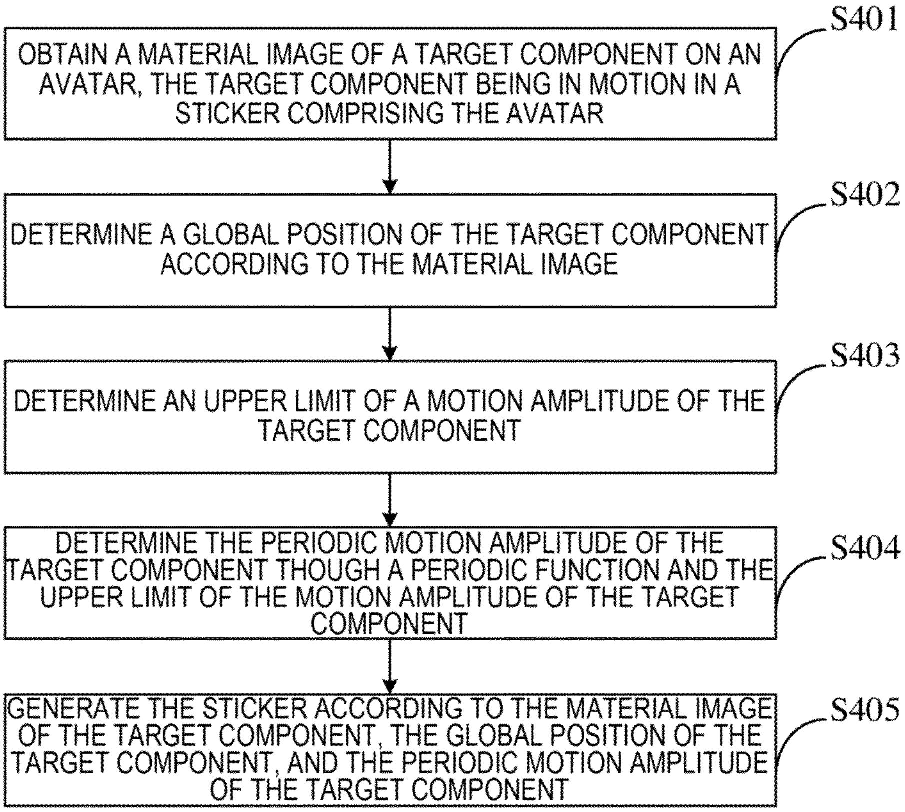
FIG. 4 is a schematic flow diagram II of a sticker generation method provided by the embodiments of the present disclosure.

With reference to FIG. 4, FIG. 4 is a schematic flow diagram II of the sticker generation method provided by the embodiments of the present disclosure. As illustrated in FIG. 4, the sticker generation method includes:

Step S401: obtaining a material image of a target component on an avatar, the target component being in motion in a sticker comprising the avatar;

Step S402: determining the global position of the target component according to the material image;

Among them, as for the implementing principles and technical effects of the Steps S401-S402, reference can be made to the preceding embodiments. No more details will be given.

Step S403: determining the upper limit of the motion amplitude of the target component;

In the implementing mode, the upper limit of the motion amplitude of the target component may be determined randomly. As an alternative, the upper limits of the motion amplitudes of different components may be preset by professionals according to experience so as to acquire the upper limit of the motion amplitude of a target component therefrom. As an alternative, the upper limit of the motion amplitude of the target component may be determined according to the features of the target component (e.g., the component size of the target component and the global position where the target component is located). Among them, the upper limits of the motion amplitudes of different target components may be different in the sticker so as to improve the accuracy and reasonability of the upper limits of the motion amplitudes. For example, the swinging amplitudes of some hair components are great, while some hair components only slightly swing.

In some embodiments, a possible implementing mode of the Step S403 includes: determining the upper limit of the motion amplitude of the target component according to the global position of the target component.

Among them, the global position of the target component reflects the size of the image region occupied by the target component, i.e., reflecting the component size of the target component. Thus, determining the upper limit of the motion amplitude of the target component according to the global position of the target component is equivalent to determining the upper limit of the motion amplitude of the target component according to the component size of the target component. Among them, the upper limit of the motion amplitude is directly proportional to the component size. That is, the larger the component size of the target component is, the larger the upper limit of the motion amplitude of the target component will be, thereby improving the reasonability of the motion of the target component.

In the present implementing mode, a component size of a target component may be determined according to the global position of the target component, and then the upper limit of the motion amplitude of the target component may be determined based on the component size of the target component. During the process of determining the component size of the target component, when the global position of the target component is determined based on the external matrix of the target component, the component size of the target component may be determined according to the pixel point coordinate of four vertexes of the external matrix of the target component. During the process of determining the upper limit of the motion amplitude of the target component, the upper limit of the motion amplitude of the target component may be determined on the basis of the preset corresponding relationship between the component size and the upper limit of the motion amplitude. As an alternative, the upper limit of the motion amplitude of the target component may be determined on the basis of the calculating equations of the component size of the target component and the upper limit of the motion amplitude, wherein the component size is directly proportional to the upper limit of the motion amplitude in the calculating equations.

Optionally, determining the upper limit of the motion amplitude of the target component according to the global position of the target component includes: determining the component size of the target component according to the global position of the target component; determining the upper limit of the motion amplitude of the target component according to the component size of the target component and the image size of the sticker.

In the present optional mode, details will not be given to the process of determining the component size according to the global position of the target component. Reference can be made to the preceding relevant contents. The image sizes of the stickers are the image sizes of the expression image in the sticker, and the image sizes of the expression image may be identical to the image sizes of the material images of the target component. These image sizes are preset. Considering that the upper limit of the motion amplitude of the target component is determined only on the basis of the component size of the target component, it is possible that the upper limit of the motion amplitude of the target component is excessively large or small. The upper limit of the motion amplitude of the target component is determined by combining the component size of the target component with the image size of a sticker, which is beneficial to avoiding this circumstance, thereby improving the reasonability of the upper limit of the motion amplitude of the target component.

Among them, the upper limit of the motion amplitude of the target component is directly proportional to the component size of the target component, and is inversely proportional to the image size of the sticker. In an example, the corresponding relationship between the two-tuples consisting of the component size of the target component and the image size of the sticker and the upper limit of the motion amplitude of the target component may be preset. In the corresponding relationship, the upper limit of the motion amplitude is directly proportional to the component size, and is inversely proportional to the image size. Thus, the upper limit of the motion amplitude of the target component may be determined in the corresponding relationship. In another example, the upper limit of the motion amplitude of the target component may be determined on the basis of the calculating equations of the component size of the target component, the image size of the sticker, and the upper limit of the motion amplitude. Among them, in the calculating equations, the component size of the target component is directly proportional to the upper limit of the motion amplitude of the target component, while the image size of the sticker is inversely proportional to the upper limit of the motion amplitude of the target component. Further, in the calculating equations, the ratio between the component size and the target component to the image size of the sticker is directly proportional to the upper limit of the motion amplitude of the target component.

Further, considering that a target component whose motion state is swinging left-right and a target component whose motion state is fluctuating up and down are affected by different factors in terms of the upper limit of the motion amplitude, wherein the upper limit of the motion amplitude of the target component in a state of swinging left-right is mainly affected by the length and width of the target component, e.g., the longer and wider the hair component is, the larger the upper limit of the motion amplitude will possibly be; the upper limit of the motion amplitude of the target component in a state of fluctuating up and down is mainly highly affected by the height of the target component in the expression image, e.g., the distances for pixel points of the upper body component at different heights to move up and down with the breath are different. Thus, as for target components in different motion states, the upper limit of the motion amplitude shall be determined in different modes so as to improve the authenticity of the motion of the target components in the sticker. Specifically, the modes of determining the upper limit of the motion amplitude are as follows:

Mode 1: when the motion state of a target component includes a state of swinging left-right, the component size of the target component includes the component height and the component width of the target component, and the upper limit of the motion amplitude of the target component includes a maximum amplitude of left-right swinging of the target component. At this time, the ratio between the component height and the target component to the image height in the image size may be determined, and the maximum amplitude of left-right swinging of the target component may be determined according to the ratio, the component width of the target component, and a first scaling parameter. Therefore, the reasonability of the upper limit of the motion amplitude is improved by combining parameters such as component height and component width of the target component.

Among them, the ratio between the component height and the target component to the image height in the image size reflects the relative height of the target component in the expression image, and also reflects the relative height of the target component. The first scaling parameter may be set according to experience, which is beneficial to improving the flexibility and reasonability of the upper limit of the motion amplitude.

In mode 1, the ratio between the component height and the target component to the image height in the image size and the product of the component width of the target component and the first scaling parameter may be determined as a maximum amplitude of left-right swinging of the target component such that the higher the component height is, the larger the upper limit of the motion amplitude of the target component with a larger component width will be, thereby improving the reasonability of the upper limit of the motion amplitude.

Optionally, the calculating equation of the maximum amplitude of left-right swinging of the target component may be represented as follows:

$$amp_1 = \alpha \cdot (x_2 - x_1)\frac{(y_2 - y_1)}{h},$$

wherein, $amp_1$ represents a maximum amplitude of left-right swinging of the target component; $\alpha$ represents the first scaling; the top-left and top-right coordinates of the target component represent $(x_1, y_1, x_2, y_2)$; $(x_2-x_1)$ represents the width of the target component; $(y_2-y_1)$ represents the height of the target component; h represents the image height in the image size.

Optionally, in mode 1, the target component is a hair component. Accordingly, different maximum amplitudes of left-right swinging may be determined for hair components with different heights (i.e., different lengths) and different widths, implementing different flowing effects for different hair components. It can be seen from the equation above that the maximum amplitude of left-right swinging is positively correlated to the width and height of the hair component, and the wider the hair component is, the larger the amplitude of left-right swinging will be, which is beneficial to improving the authenticity of left-right hair flowing.

Mode 2: When the motion state of the target component includes an up-down fluctuation state, the component size of the target component includes the component height of the target component, and the upper limit of the motion amplitude of the target component includes a maximum amplitude of up-down fluctuation of a plurality of columns of vertexes in the target component. At this time, the ratio between the component height and the target component to the image height in the image size may be determined, and floating weights corresponding to the plurality of rows of vertexes in the target component may be determined through a non-linear function. Afterwards, a maximum amplitude of up-down fluctuation of the plurality of columns of vertexes may be determined according to the ratio, the component height of the target component, the floating weights corresponding to the plurality of rows of vertexes, and a second scaling parameter. Thus, the accuracy of the maximum amplitude of up-down fluctuation of the plurality of columns of vertexes is improved by refining the up-down fluctuation of the target component to up-down fluctuation of the plurality of column of vertexes in the target component and by combining the component height of the target component, the floating weights, and the second scaling parameter, thereby improving the reasonability of the up-down fluctuation of the target component in the sticker.

Among them, the ratio between the component height and the target component to the image height in the image size reflects the relative height of the target component in the expression image; the second scaling parameter may be set according to experience, which is beneficial to improving the flexibility and reasonability of the upper limit of the motion amplitude; a plurality of rows of vertexes in the target component are a plurality of rows of vertexes on the material image of the target component, and a vertex grid with a size of m*n is distributed on the material image so as to control motion of the material image by controlling respective vertexes in the vertex grid.

In mode 2, considering that the amplitudes of up-down fluctuation of the upper body at different positions are different when a character breathes in the real scenario, the motion amplitudes of up-down fluctuation of different vertexes are possibly different, and floating weights corresponding to a plurality of rows of vertexes are determined through a non-linear function. Afterwards, the ratio between the component height and the target component to the image height in the image size, the component height of the target component, a product of a floating weight of a plurality of rows of vertexes and a second scaling parameter are determined as a maximum amplitude of up-down fluctuation of the plurality of columns of vertexes on the target component. Accordingly, the motion amplitudes of up-down fluctuation of different vertexes are fully considered, and the component height of the target component is considered, thereby improving the authenticity of motion of the target component, i.e., improving the authenticity of the sticker.

Optionally, considering that the state of the up-down fluctuation of the target component in the sticker is a state of an upward bending radian similar to a sinusoidal function, and a sinusoidal function may be used for the non-linear function so as to further improve the authenticity of the up-down fluctuation of the target component and improve the authenticity of the sticker.

Optionally, the calculating equation of a maximum amplitude of up-down fluctuation of a plurality of columns of vertexes on the target component is represented as follows:

$$amp_2 = \beta \cdot \sin\left(\frac{\pi}{10} * j\right)(y_2 - y_1)\frac{(y_2 - y_1)}{h},$$

wherein $amp_2$ represents the maximum amplitude of the up-down fluctuation of the $j^{th}$ vertex on the target component; β represents a second scaling parameter;

$$\sin\left(\frac{\pi}{10} * j\right)$$

represents a floating weight corresponding to the $j^{th}$ vertex.

Optionally, a plurality of rows of vertexes in the target component are vertexes located in the central region of the target component. Accordingly, in the sticker, only the up-down floating of some regions of the control component is controlled. For example, only the up-down fluctuation of the chest region of the body component due to breathing is controlled so as to improve the authenticity of the sticker. Among them, the plurality of rows of vertexes in the target component may be represented as $Vert_{m_1 \le i \le m_2, n_1 \le j \le n_2}$, and which vertexes that fluctuate up and down is controlled is determined by setting the values of $m_1$, $m_2$, $n_1$, and $n_2$, i being an index of lines of vertexes, and j being an index of rows of vertexes.

Optionally, in mode 2, the target component is a body component. Accordingly, the amplitude of up-down fluctuation of the body component due to breathing may be controlled by determining a maximum amplitude of up-down fluctuation of a plurality of lines of vertexes in the body component, thereby improving the authenticity of the sticker.

Step S404: determining a periodic motion amplitude of the target component through the periodic function and the upper limit of the motion amplitude of the target component.

Among them, the periodic function in Step S404 is used to determine the motion amplitude of the target component at a plurality of moments, i.e., the periodic motion amplitude of the target component, having a different effect from that of the non-linear function for determining the maximum amplitude of the up-down fluctuation of the plurality of columns of vertexes.

In the embodiments, after the upper limit of the motion amplitude of the target component is determined, the motion amplitude of the target component at a plurality of moments in the sticker shall be determined on the basis of the upper limit of the motion amplitude of the target component. Considering that the flowing of the hair component or up-down fluctuation of the body component due to breathing may be deemed as a periodic motion, the motion amplitude of the target component at a plurality of moments in the sticker is determined on the basis that the periodic function is at the upper limit of the motion amplitude of the target component. For example, the motion amplitude of the target component at a plurality of moments in the sticker may be acquired by multiplying the upper limit of the motion amplitude of the target component with the periodic function.

In some embodiments, the same periodic function may be used for different target components such that the motion rules of the postures of different target components at the same moment are consistent, thereby improving the motion harmony of different target components.

In some embodiments, a possible implementing mode of Step S404 includes: determining the motion weights of the target component at a plurality of moments through a periodic function; determining the periodic motion amplitude of the target component according to the motion weights of the target component at the plurality of moments and the upper limit of the motion amplitude of the target component.

In the implementing mode, as the value of the periodic function varies periodically, the values of the periodic function at a plurality of moments may be determined as motion weights of a target component at a plurality of moments. Afterwards, the product of the motion weight of a target component at a plurality of moments and the upper limit of the motion amplitude of the target component may be determined as the motion amplitude of the target component at a plurality of moments, i.e., the periodic motion amplitude of the target component. As the motion weights of the target component at a plurality of moments is periodic, the motion amplitude of the target component at a plurality of moments is also periodic, thereby effectively improving the authenticity of the sticker.

Optionally, during the process of determining the motion weights of the target component at a plurality of moments through a periodic function, the motion weights of the target components at a plurality of moments is determined through the periodic function according to an image frame number of the sticker and a frame rate of the sticker. Accordingly, the motion weights of the target component at a plurality of moments in the sticker is determined accurately by combining the image frame number and a frame rate of the sticker in the periodic function.

In the present optional mode, input data may be determined according to an image frame number of the sticker and a frame rate of the sticker to input the input data to the periodical function, thereby obtaining the motion weights of the target component at a plurality of moments.

Further, with regard to respective moments, the frame sequence of the expression image corresponding to the moments in the sticker may be determined, the ratio between the frame sequence and the expression image corresponding to the moments in the sticker to the frame rate of the sticker may be determined as the input data corresponding to the moments, and the input data corresponding to the moments may be inputted to a periodic function to acquire the motion weights of the target component at the moments.

Optionally, a periodic function is determined according to a duration of the sticker so as to improve the reasonability and accuracy of the periodic function when the sticker is generated.

In the present optional mode, the duration of the sticker is determined as the period of a periodic function, and the twofold duration of the sticker is determined as the period of a periodic function, and shall be determined specifically according to the range of variation of the function value of the periodic function.

Optionally, the periodic function is a sinusoidal function. As the law of the changes in the function values of a sinusoidal function is similar to the law of motion of a target component on an avatar, and the sinusoidal function is used to participate in determining the motion weight of a target component at a plurality of moments, which can improve the accuracy and fluency of the motion amplitude of the target component at a plurality of moments, thereby improving the accuracy, fluency, and authenticity of the facial expression of an avatar in a sticker.

Further, when the periodic function is a sinusoidal function, the periodic function may be represented as follows:

$$f(x)=\sin(wx),$$

wherein, T=2π/|w|; T is a period; x is input of a sinusoidal function; w is a parameter.

On the basis of the equation above, a motion weight of a target component at a plurality of moments may be determined by combining an image frame number of the sticker and a frame rate of the sticker. At this time, the periodic function may be represented as follows:

$$\text{weight}=\sin\left(w\frac{i}{fps}\right),$$

wherein weight represents a motion weight; fps is a frame rate of the sticker; i represents $i^{th}$ image. Suppose the $i^{th}$ image corresponds to the moment t, the motion weight of a target component at the moment t may be obtained through the equation above.

Suppose that the duration of the sticker is 1 second, the duration of the sticker is equivalent to a half period of the sinusoidal function, and the period of the sinusoidal function is 2 seconds. At this time, the periodic function may be represented as follows:

$$\text{weight}=\sin\left(2\pi\frac{i}{fps}\right).$$

Further, the calculating equation of the amplitude of the periodic motion of the target component may be represented as follows:

$$amp_k^t=amp_k*\text{weight},$$

wherein, $$amp_k^t$$

represents the periodic motion amplitude; k is 1 or 2; when k=1, what is solved by the equation is an amplitude of left-right swinging of the target component at the moment t; when k=2, what is solved by the equation is an amplitude of up-down fluctuation of the target component at the moment t.

Step S405: generating a sticker according to the material image of the target component, the global position of the target component, and the periodic motion amplitude of the target component.

Among them, as for the implementing principles and the technical effects of the Step S405, reference can be made to the preceding embodiments. No more details will be repeated.

In the embodiments of the present disclosure, the upper limit of the periodic motion amplitude of the target component in motion on the avatar is determined, and the periodic motion amplitude of the target component is determined by using a periodic function on the basis of the upper limit of the motion amplitude such that the target component moves in the sticker according to the periodic trends. For example, a hair component flows periodically left-right, a body component fluctuates up and down periodically with the breath, which reduces the difficulty in making the sticker, and also improves the authenticity of the sticker.

In some embodiments, during the process of generating a sticker according to the material image of the target component, the global position of the target component, and the periodic motion amplitude of the target component, a possible implementing mode includes: determining the position and shape of the material image on each frame of an expression image in the sticker by a driving algorithm according to the global position of the target component and the periodic motion amplitude of the target component so as to acquire the sticker.

In the embodiments, the driving algorithm is used for driving a material image. Specifically, the material image of a component is driven to a corresponding position and a corresponding shape according to the global position of the component and the action posture of the component. With regard to a target component in motion, the material image of the target component is also driven to a corresponding position with the driving algorithm by making reference to the global position of the target component and a motion amplitude of the target component at a plurality of moments. Thus, the driven material image constitutes an expression image in the sticker.

As the processes of treating target components and the remaining components except the target components in the driving process only lie in that the target components have corresponding motion amplitudes, the motion amplitudes shall be added only during position driving, and other processes are the same. Thus, the process of driving components by a driving algorithm is described consistently below.

Optionally, in the driving algorithm, as for various components, the component images may be acquired from the material images of the components. The component images are divided into a plurality of rectangular image regions to acquire vertexes of respective image regions. The depth values of respective vertexes are determined such that the component images present a 3D-like effect visually, and an avatar in the sticker is more three-dimensional, thereby improving the effect of generating a sticker.

Among them, the depth values corresponding to different components may be preset. The positional relationship of the material images may also be determined on the basis of the image identifications (e.g., an image name) of the material images, thereby determining corresponding depth values.

Optionally, in the driving algorithm, information on facial features may be determined according to global positions of a plurality of components, the rotation matrixes of respective material images may be determined according to action postures of a plurality of components at a plurality of moments, and displacement transformation and rotation may be performed on the material images according to the information on facial features and the rotation matrixes of respective material images.

Among them, the information on facial features associated with a plurality of key points may be determined on the basis of the global positions of a plurality of key points (e.g., eyebrows, eyes, pupils, and mouth) on the material images of components so as to improve the stability of the information on facial features, thereby improving the stability of facial expressions, wherein the information on facial features includes a height that the left/right eyebrow moves, a height that the left/right eye opens, how big the mouth opens, and so forth.

In the present optional mode, after the information on facial features associated with a plurality of key points are acquired, a maximum deformation value of the plurality of key points may be determined on the basis of the information on the facial features. Among them, the maximum deformation value of key points on the face may include an upper limit value and a lower limit value for motion of key points. For example, the upper limit value of eyes is the feature value when the eyes open, and the lower limit value is the feature value when the eyes are closed.

In the present optional mode, with regard to respective key points, corresponding feature values when key points vary (e.g., eyes blink up and down) may be determined among the information on facial features of key points. The deformation values of key points, i.e., displacement values of key points, may be determined according to the corresponding feature values when the key points vary and the maximum deformation value corresponding to the key points. Changes in the positions of key points may be driven, drawn, and rendered according to the displacement values of the key points to implement deformation of the key points, and material images may be rotated according to the rotation matrixes of the material images. In this way, driving of the material images of the components are completed, thereby implementing automatic generation of the sticker.

Optionally, during driving, considering that a blank or gap will be generated when a component is deformed, morphology may be used for image filling at this time so as to improve the effect of generating a sticker. For example, images of upper and lower eyebrows and the image of the mouth are generated automatically by using morphology.

Through the embodiments above, a sticker may be acquired, and each frame of the expression image of an avatar in the sticker may also be acquired. In particular, a freeze-frame expression image of the avatar may be acquired. That is, the facial expression of the avatar is an expression image of a target facial expression. As the facial expression of the avatar in the sticker varies from the initial facial expression to the target facial expression, and then from the target facial expression to the initial facial expression, the freeze-frame expression image is an expression image with the largest amplitude of the facial expression of an avatar in the sticker, thereby improving the efficiency of making the dynamic sticker and static freeze-frame expression image, reducing the making difficulty, and improving the experience of making a user's sticker.

Figure 5:
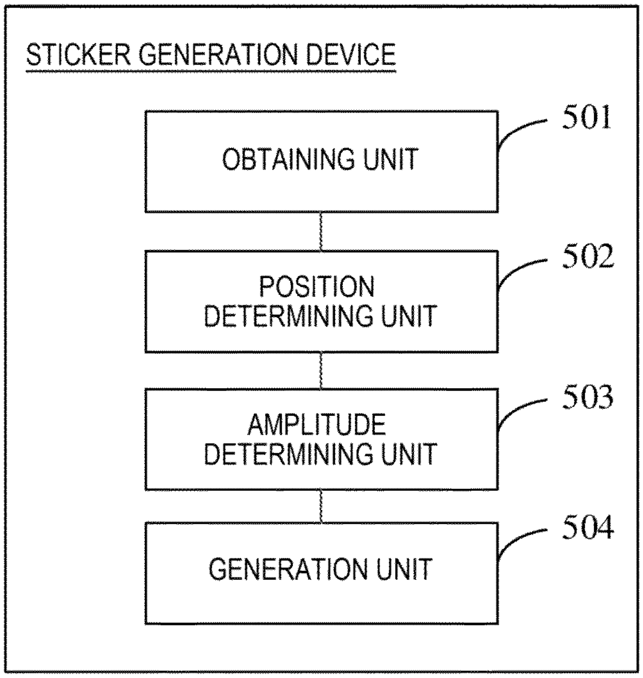
FIG. 5 is a block diagram of the structure of a model determining device provided by the embodiments of the present disclosure.

Corresponding to the sticker generation method in the embodiments above, FIG. 5 is a block diagram of the structure of a sticker generation device provided in the embodiments of the present disclosure. For facilitating illustration, only parts associated with the embodiments of the present disclosure are illustrated. With reference to FIG. 5, the sticker generation device includes: an acquisition unit 501, a position determining unit 502, an amplitude determining unit 503, and a generation unit 504.

The acquisition unit 501 is used for obtaining a material image of a target component on an avatar, the target component being in motion in a sticker of the avatar.

The position determining unit 502 is used for determining a global position of the target component according to the material image.

The amplitude determining unit 503 is used for determining a periodic motion amplitude of the target component in the sticker.

The generation unit 504 is used for generating the sticker according to the material image, the global position, and the periodic motion amplitude.

In some embodiments, during the process of determining the periodic motion amplitude of the target component in the sticker, the amplitude determining unit 503 is specifically used for: determining an upper limit of the motion amplitude of the target component; determining the periodic motion amplitude through a periodic function and the upper limit of the motion amplitude.

In some embodiments, during the process of determining the periodic motion amplitude of the target component in the sticker, the amplitude determining unit 503 is specifically used for: determining a motion weights of the target component at a plurality of moments through the periodic function; determining the periodic motion amplitude according to the motion weights of the target component at a plurality of moments and the upper limit of the motion amplitude thereof.

In some embodiments, during the process of determining the motion weights of the target component at a plurality of moments through a periodic function, the amplitude determining unit 503 is specifically used for: determining the motion weights of the target component at a plurality of moments according to an image frame number of the sticker and a frame rate of the sticker.

In some embodiments, the sticker generation device further includes: a function determining unit (not shown in the Figure) for determining a periodic function according to a duration of the sticker, wherein the periodic function is a sinusoidal function.

In some embodiments, during the process of determining the upper limit of the motion amplitude of the target component, the amplitude determining unit 503 is specifically used for: determining the upper limit of the motion amplitude according to the global position, the global position reflecting the component size of the target component, the upper limit of the motion amplitude being directly proportional to the component size.

In some embodiments, during the process of determining the upper limit of the motion amplitude according to the global position, the amplitude determining unit 503 is specifically used for: determining a component size according to the global position; determining the upper limit of the motion amplitude according to the component size and the image size of the sticker.

In some embodiments, the motion state includes a state of swinging left-right, the component size comprising a component height and a component width of the target component, the upper limit of the motion amplitude comprising a maximum amplitude of left-right swinging. During the process of determining the upper limit of the motion amplitude according to the component size and the image size of the sticker, the amplitude determining unit 503 is specifically used for: determining the ratio between the component size and an image height in the image size; determining a maximum amplitude of left-right swinging of the target component according to the ratio, the component width, and a first scaling parameter.

In some embodiments, the motion state includes an up-down fluctuation state, the component size comprising a component height of the target component, the upper limit of the motion amplitude comprising a maximum amplitude of up-down fluctuation of the plurality of columns of vertexes in the target component. During the process of determining the upper limit of the motion amplitude according to the component size and the image size of the sticker, the amplitude determining unit 503 is specifically used for: determining the ratio between the component size and an image height in the image size; determining floating weights corresponding to the plurality of rows of vertexes through a non-linear function; determining a maximum amplitude of the up-down fluctuation of a plurality of columns of vertexes according to the ratio, the component weight, the floating weights corresponding to the plurality of rows of vertexes, and a second scaling parameter.

In some embodiments, during the process of generating a sticker according to the material image, the global position, and the periodic motion amplitude, the generation unit 504 is specifically used for: determining the position and shape of the material image on each frame of an image in the sticker by a driving algorithm according to the global position and the periodic motion amplitude to acquire the sticker.

In some embodiments, during the process of determining the global position of a target component according to the material image, the position determining unit 502 is specifically used for determining an external matrix of the target component in the material image; determining the global position according to the external matrix.

A sticker generation device provided by the embodiments may be used for executing the technical solutions of the embodiments that execute the sticker generation method above, and the implementing principles and the technical effects are similar. No more details will be repeated in the embodiments here.

Figure 6:
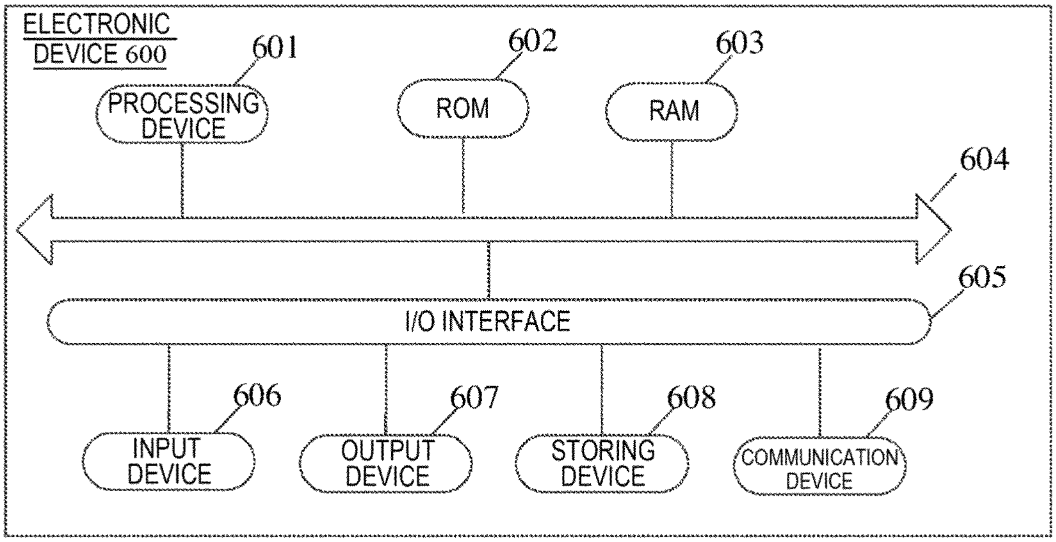
FIG. 6 is a schematic diagram of the hardware structure of an electronic device provided by the embodiments of the present disclosure.

FIG. 6 illustrates a schematic diagram of the structure of an electronic device 600 for implementing the embodiments of the present disclosure. The electronic device 600 may be a terminal device or a server. Among them, the terminal device may include but not limited to mobile terminals such as mobile phone, laptop, digital broadcast receiver, Personal Digital Assistant (PDA for short), tablet (Portable Android Device, PAD for short), Portable Media Player (PMP for short), and in-vehicle terminal (e.g., in-vehicle navigation terminals) and fixed terminals such as digital TV and desktop computer. The electronic device illustrated in FIG. 6 is only an example, and shall not bring any restriction to the functions and scope of use in the embodiments of the present disclosure.

As illustrated in FIG. 6, the electronic device 600 may include a processing apparatus 601 (e.g., central processing unit, graphics processing unit and so forth) which may perform various appropriate actions and treatments according to a program stored in a Read Only Memory (ROM for short) 602 or a program loaded to a Random Access Memory (RAM for short) 603 from a storing apparatus 608. Various programs and data required for operating the electronic device 600 are also stored in the RAM 603. The processing apparatus 601, the ROM 602, and the RMA 603 are interconnected through a bus 604. An input/output (I/O) interface 605 is also connected to the bus 604.

Generally, the following apparatuses may be connected to the I/O interface 605: comprising input apparatuses 606 such as touch screen, touchpad, keyboard, mouse, camera, microphone, accelerometer, and gyroscope; output apparatuses 607 such as Liquid Crystal Display (LCD for short), speaker, and vibrator; storing apparatuses 608 such as tape and hard disk; and a communication apparatus 609. The communication apparatus 609 may allow wireless or wired communication of the electronic device 600 with other devices so as to exchange data. Although FIG. 6 illustrates an electronic device 600 with various apparatuses, it should be understood that it is not necessary to implement or have all apparatuses shown. It is possible to alternatively implement or have more or fewer apparatuses.

Especially, according to the embodiments of the present disclosure, the process described by referring to the flow diagram above may be implemented as a computer software program. For example, the embodiments of the present disclosure include a computer program product, comprising a computer program carried on a computer readable medium, the computer program comprising a program code for executing the method shown in the flow diagram. In such embodiments, the computer program may be downloaded and mounted from the internet through the communication apparatus 609 or mounted from the storing apparatus 608 or mounted from the ROM 602. When the computer program is executed by the processing apparatus 601, the functions above defined in the method of the embodiments of the present disclosure are executed. The embodiments of the present disclosure further include a computer program which implements, when executed by a processor, the functions above defined in the method of the embodiments of the present disclosure.

It should be noted that the computer readable medium of the present disclosure above may be a computer readable signal medium or a computer readable storage medium or any combination of both of them above. The computer readable storage medium, for example, may be but not limited to electronic, magnetic, optical, electromagnetic, infrared, or semiconductor systems, apparatuses, or devices or any combinations of the above. More specific examples of computer readable storage media may include but not limited to an electrical connection with one or more wires, a portable computer disk, a hard disk, a random access memory (RAM), a read-only memory (ROM), an electrically erasable programmable read-only memory (EEPROM or a flash memory), an optical fiber, a compact disc read-only memory (CD-ROM), a light storage device, a magnetic storage device, or any appropriate combinations above. In the present disclosure, the computer readable storage medium may be any tangible medium comprising or storing a program which may be instructed to execute use of a system, an apparatus or a device or use thereof in combination. Moreover, in the present disclosure, the computer readable signal medium may include data signals transmitted in a base band or as a part of carrier waves, carrying a computer readable program code. Various forms may be adopted for such data signals transmitted, comprising but not limited to an electromagnetic signal, an optical signal or any appropriate combinations of the above. The computer readable signal medium may also be any computer readable medium in addition to the computer readable storage medium. The computer readable signal medium may send, disseminate or transmit a program for executing use of a system, an apparatus or a device or use thereof in combination by an instruction. The program code included on the computer readable medium may be transmitted by any appropriate medium comprising but not limited to an electric wire, an optical cable, RF (Radio Frequency) and so forth, or any appropriate combinations of the above.

The computer readable medium above may be included in the electronic device above, and may also exist separately, not assembled in the electronic device.

The computer readable medium above is carried with one or more programs which, when executed by the electronic device, enable the electronic device to execute the method illustrated in the embodiments above.

The computer program code for executing the operation of the present disclosure may be written with one or more program design languages or combinations thereof. The program design languages above include object-oriented program design languages such as Java, Smalltalk, and C++, and also include conventional procedural program design languages such as "C" language or similar program design languages. The program code may be executed completely on a user's computer, executed partially on the user's computer, executed as an independent software package, executed partially on the user's computer and partially on a remote computer, or executed completely on the remote computer or a server. Under the circumstance where a remote computer is involved, the remote computer may be connected to a user's computer through any type of networks comprising Local Area Network (LAN for short) or Wide Area Network (WAN for short), or may be connected to an external computer (e.g., connected through an internet by using an internet service provider).

The flow diagrams and block diagram in the accompanying drawings illustrate the system architecture, functions, and operations that are possibly implemented according to the system, method, and computer program product in respective embodiments of the present disclosure. In this point, each block in the flow diagrams or block diagram may represent a part of a module, a program block, or a code, the part of the module, the program block, or the code comprising one or more executable instructions for implementing the specified logical functions. It should also be noted that in some alternative implementations, the functions labeled in a block may occur in a different order from that labelled in the accompanying drawings. For example, as a matter of fact, two blocks which are indicated in succession may be basically executed in parallel, and they may also be executed in an opposite order sometimes, which depends on the functions involved. It should also be noted that each block in a block diagram and/or flow diagram and a combination of blocks in the block diagram and/or flow diagram may be implemented with a dedicated hardware-based system for executing specified functions or operations or may be implemented with a combination of special-purpose hardware and computer instructions.

Units involved as described in the embodiments of the present disclosure may be implemented by means of software, and may also be implemented by means of hardware, wherein names of the units do not constitute definitions of the units under certain circumstances. For example, a first acquisition unit may also be described as "a unit for obtaining at least two internet protocol addresses".

The functions described herein above may be at least executed partially by one or more hardware logic units. For example, non-limitedly, exemplary hardware logic units that may be used include: a Field Programmable Gate Array (hereinafter referred to as FPGA), an Application Specific Integrated Circuit (hereinafter referred to as ASIC), an Application Specific Standard Product (hereinafter referred to as ASSP), a System on Chip (hereinafter referred to as SOC), a Complex Programmable Logic Device (hereinafter referred to as CPLD), and so forth.

In the context of the present disclosure, the machine readable media may be tangible media, and may also include or store programs for instructions to execute use of a system, an apparatus or a device or for instructions to execute use in combination with the system, apparatus or device. The machine executable media may be machine readable signal media or machine readable storage media. The machine readable media may include but not limited to electronic, magnetic, optical, electromagnetic, infrared, or semiconductor systems, apparatuses, or devices, or any proper combinations of the contents above. More specific examples of machine readable media will include an electrical connection with one or more wires, a portable computer disk, a hard disk, a random access memory (RAM), a read-only memory (ROM), an electrically erasable programmable read-only memory (EEPROM or a flash memory), an optical fiber, a compact disc read-only memory (CD-ROM), a light storage device, a magnetic storage device, or any proper combinations of the contents above.

In a first aspect, according to one or more embodiments of the present disclosure, provided with is a sticker generation method, comprising: obtaining a material image of a target component on an avatar, the target component being in motion in the sticker comprising the avatar; determining a global position of the target component according to the material image; determining a periodic motion amplitude of the target component in the sticker; generating the sticker according to the material image, the global position, and the periodic motion amplitude.

According to one or more embodiments of the present disclosure, determining the periodic motion amplitude of the target component in the sticker includes: determining an upper limit of the motion amplitude of the target component; determining the periodic motion amplitude according to a periodic function and the upper limit of the motion amplitude.

According to one or more embodiments of the present disclosure, determining the periodic motion amplitude of the target component in the sticker includes: determining a motion weight of the target component at a plurality of moments through the periodic function; determining the periodic motion amplitude according to the motion weights of the target component at a plurality of moments and the upper limit of the periodic motion amplitude.

According to one or more embodiments of the present disclosure, determining the motion weights of the target component at a plurality of moments through the periodic function includes: determining the motion weights of the target component at a plurality of moments through the periodic function according to an image frame number of the sticker and a frame rate of the sticker.

According to one or more embodiments of the present disclosure, before the motion weights of the target component at a plurality of moments is determined through the periodic function, what is further included is as follows: determining the periodic function according to a duration of the sticker, wherein the periodic function is a sinusoidal function.

According to one or more embodiments of the present disclosure, determining an upper limit of the motion amplitude of the target component includes: determining the upper limit of the motion amplitude according to the global position, the global position reflecting the component size of the target component, the upper limit of the motion amplitude being directly proportional to the component size.

According to one or more embodiments of the present disclosure, determining the upper limit of the motion amplitude according to the global position includes: determining the component size according to the global position; determining the upper limit of the motion amplitude according to the component size and the image size of the sticker.

According to one or more embodiments of the present disclosure, the motion state includes an up-down swinging state, the component size comprising a component height and a component width of the target component, the upper limit of the motion amplitude comprising a maximum amplitude of left-right swinging of the target component, determining the upper limit of the motion amplitude according to the component size and an image size of the sticker, comprising: determining a ratio between the component height and the image height in the image size; determining the maximum amplitude of left-right swinging of the target component according to the ratio, the component width, and a first scaling parameter.

According to one or more embodiments of the present disclosure, the motion state includes an up-down fluctuation state, the component size comprising a component height of the target component, the upper limit of the motion amplitude comprising a maximum amplitude of up-down fluctuation of a plurality of columns of vertexes in the target component, determining the upper limit of the motion amplitude according to the component size and an image size of the sticker, comprising: determining the ratio between the component height and an image height in the image size; determining floating weights corresponding to the plurality of rows of vertexes through a non-linear function; determining a maximum amplitude of up-down fluctuation of the plurality of columns of vertexes according to the ratio, the component weight, the floating weights corresponding to the plurality of rows of vertexes, and a second scaling parameter.

According to one or more embodiments of the present disclosure, generating the sticker according to the material image, the global position, and the periodic motion amplitude includes: determining the position and shape of the material image on each frame of an image in the sticker by a driving algorithm to acquire the sticker.

According to one or more embodiments of the present disclosure, determining the global position of the target component according to the material image includes: determining an external matrix of the target component in the material image; determining the global position according to the external matrix.

In a second aspect, according to one or more embodiments of the present disclosure, provided with is a sticker generation device, comprising: an acquisition unit for obtaining a material image of a target component on an avatar, the target component being in motion in a sticker of the avatar; a position determining unit for determining a global position of the target component according to the material image; an amplitude determining unit for determining a periodic motion amplitude of the target component in the sticker; a generation unit for generating the sticker according to the material image, the global position, and the periodic motion amplitude.

According to one or more embodiments of the present disclosure, determining a periodic motion amplitude of the target component in the sticker includes: determining an upper limit of the motion amplitude of the target component; determining the periodic motion amplitude through a periodic function and the upper limit of the motion amplitude.

According to one or more embodiments of the present disclosure, determining a periodic motion amplitude of the target component in the sticker includes: determining a motion weight of the target component at a plurality of moments through a periodic function; determining the periodic motion amplitude according to the motion weights of the target component at a plurality of moments and the upper limit of the motion amplitude.

According to one or more embodiments of the present disclosure, determining motion weights of the target component at a plurality of moments through a periodic function includes: determining the motion weights of the target component at the plurality of moments through the periodic function according to an image frame number of the sticker and a frame rate of the sticker.

According to one or more embodiments of the present disclosure, before the motion weights of the target component at the plurality of moments is determined through the periodic function, which is further included is as follows: determining the periodic function according to a duration of the sticker, wherein the periodic function is a sinusoidal function.

According to one or more embodiments of the present disclosure, determining the upper limit of the motion amplitude of the target component includes: determining the upper limit of the motion amplitude according to the global position, the global position reflecting a component size of the target component, the upper limit of the motion amplitude being directly proportional to the component size.

According to the one or more embodiments of the present disclosure, determining the upper limit of the motion amplitude according to the global position includes: determining the component size according to the global position; determining the upper limit of the motion amplitude according to the component size and an image size of the sticker.

According to one or more embodiments of the present disclosure, the motion state includes a state of left-right swinging. The component size includes a component height and a component width of the target component. The upper limit of the motion amplitude includes a maximum amplitude of left-right swinging of the target component. Determining the upper limit of the motion amplitude according to the component size and the image size of the sticker includes: determining the ratio between the component height and the image height in the image size; determining a maximum amplitude of left-right swinging of the target component according to the ratio, the component width, and a first scaling parameter.

According to one or more embodiments of the present disclosure, the motion state includes an up-down fluctuation state. The component size includes a component height of the target component. The upper limit of the motion amplitude includes a maximum amplitude of up-down fluctuation of a plurality of columns of vertexes in the target component. Determining the upper limit of the motion amplitude according to the component size and an image size of the sticker includes: determining the ratio between the component height and the image height in the image size; determining floating weights corresponding to the plurality of rows of vertexes through a non-linear function; determining a maximum amplitude of up-down fluctuation of the plurality of columns of vertexes according to the ratio, the component height, the floating weights corresponding to the plurality of rows of vertexes and a second scaling parameter.

According to one or more embodiments of the present disclosure, generating the sticker according to the material image, the global position, and the periodic motion amplitude includes: determining the position and shape of the material image on each frame of an image in the sticker by driving an algorithm to acquire the sticker.

According to one or more embodiments of the present disclosure, determining the global position of the target component according to the material image includes: determining an external matrix of the target component in the material image; determining the global position according to the external matrix.

In a third aspect, according to one or more embodiments of the present disclosure, provided with is an electronic device, comprising: at least one processor and a memory; the memory storing a computer executive instruction; the at least one processor executing the computer executive instruction stored by the memory such that the at least one processor executes the sticker generation method as claimed in the first aspect and various possible designs of the first aspect above.

In a fourth aspect, according to one or more embodiments of the present disclosure, provided with is a computer readable storage medium, the computer readable storage medium storing a computer executive instruction therein, and implementing the sticker generation method as claimed in the first aspect and various possible designs of the first aspect above when a processor executes the computer executive instruction.

In a fifth aspect, according to one or more embodiments of the present disclosure, provided with is a computer program product which includes a computer executable instruction which, when executed by a processor, implements the sticker generation method as claimed in the first aspect and various possible designs of the first aspect above.

In a sixth aspect, according to one or more embodiments of the present disclosure, provided with is a computer program. When executed by a processor, the computer program implements the sticker generation method as claimed in the first aspect and various possible designs of the first aspect above. What are described above are only to illustrate better embodiments and the technical principles utilized in the present disclosure. Those skilled in the art should understand that the scope of the disclosure involved in the present disclosure are not limited to the technical solutions consisting of specific combinations of the technical features above, and should also cover other technical solutions formed by any combinations of the technical features above or equivalent features, e.g., the technical solutions formed by replacing the features above with the technical features with similar functions (but not limited to) that disclosed in the present disclosure, when the conception disclosed above is not deviated at the same time.

Additionally, although respective operations are described with specific orders, this should not be understood as follows: these operations are required to be executed in specific orders or in sequential orders shown. In an environment, multitasking and parallel processing may be possibly beneficial. Similarly, several specific implementation details are included in the discussions above, but these should not be interpreted as limitation to the scope of the present disclosure. Some features described in the context of a single embodiment may also be implemented combinatorically in the single embodiment. In contrary, various features described in the context of a single embodiment may also be implemented in a plurality of embodiments separately or in any appropriate combination manner.

Although languages of logic actions specific for structural features and/or methods are used to describe the subject matter, it should be understood that the subject matter defined in the claims as attached is not inevitably restricted to the specific features or actions described above. In contrary, the specific features and actions described above are only exemplary forms for implementing the claims.

What is claimed is:

1. A method of generating a sticker, comprising:

obtaining a material image of a target component on an avatar;

determining a global position of the target component according to the material image;

determining a periodic motion amplitude of the target component in the sticker, wherein determining the periodic motion amplitude of the target component comprises:

determining an upper limit of a motion amplitude of the target component, and determining the periodic motion amplitude according to a periodic function and the upper limit of the motion amplitude;

generating the sticker according to the material image, the global position, and the periodic motion amplitude, wherein in the sticker, the target component is driven to move according to the global position and the periodic motion amplitude.

2. The method of claim 1, wherein determining the periodic motion amplitude of the target component comprises:

determining motion weights of the target component at a plurality of moments using the periodic function; and determining the periodic motion amplitude according to the motion weights of the target component at a plurality of moments and the upper limit of the motion amplitude.

3. The method of claim 2, wherein determining the motion weights of the target component at a plurality of moments using the periodic function comprises:

determining the motion weights of the target component at the plurality of moments using the periodic function according to an image frame number and a frame rate of a sticker to be generated.

4. The method of claim 2, wherein before determining the motion weights of the target component at a plurality of moments using the periodic function, the method further comprises:

determining the periodic function according to a duration of a sticker to be generated, wherein the periodic function is a sinusoidal function.

5. The method of claim 1, wherein determining the upper limit of the motion amplitude of the target component comprises:

determining the upper limit of the motion amplitude according to the global position, the global position indicating a component size of the target component, and the upper limit of the motion amplitude being directly proportional to the component size.

6. The method of claim 5, wherein determining the upper limit of the motion amplitude according to the global position comprises:

determining the component size according to the global position; and determining the upper limit of the motion amplitude according to the component size and an image size of a sticker to be generated.

7. The method of claim 6, wherein in the generated sticker the target component is in a first motion state, the first motion state comprising a state of left-right swinging, the component size comprising a component height and a component width of the target component, the upper limit of the motion amplitude comprising a maximum amplitude of left-right swinging of the target component, determining the upper limit of the motion amplitude according to the component size and the image size of the sticker comprising:

determining a ratio between the component height and an image height in the image size; and determining the maximum amplitude of left-right swinging of the target component according to the ratio, the component width, and a first scaling parameter.

8. The method of claim 6, wherein in the generated sticker the target component is in a second state, the second motion state comprising an up-down fluctuation state, the component size comprising a component height of the target component, the upper limit of the motion amplitude comprising a maximum amplitude of up-down fluctuation of a plurality of columns of vertexes in the target component, determining the upper limit of the motion amplitude according to the component size and the image size of the sticker comprising:

determining a ratio between the component height and an image height in the image size;

determining floating weights corresponding to the plurality of columns of vertexes through a non-linear function; and determining the maximum amplitude of up-down fluctuation of the plurality of columns of vertexes according to the ratio, the component weight, the floating weights corresponding to the plurality of columns of vertexes and a second scaling parameter.

9. The method of claim 1, wherein generating the sticker according to the material image, the global position, and a periodic motion amplitude comprises:

determining a position and a shape of the material image on each frame of image in the sticker through a driving algorithm according to the global position and the periodic motion amplitude, to obtain the sticker.

10. The method of claim 1, wherein determining the global position of the target component according to the material image comprises:

determining an external matrix of the target component in the material image;

determining the global position according to the external matrix.

11. An electronic device, comprising:

at least one processor and a memory;

the memory storing a computer executive instruction;

the at least one processor executing the computer executive instruction stored by the memory such that the at least one processor executes operations comprising:

obtaining a material image of a target component on an avatar;

determining a global position of the target component according to the material image;

determining a periodic motion amplitude of the target component, wherein determining the periodic motion amplitude of the target component comprises:

determining an upper limit of a motion amplitude of the target component, and determining the periodic motion amplitude according to a periodic function and the upper limit of the motion amplitude;

generating a sticker according to the material image, the global position, and the periodic motion amplitude, wherein in the generated sticker, the target component is driven to move according to the global position and the periodic motion amplitude.

12. The electronic device of claim 11, wherein determining the periodic motion amplitude of the target component comprises:

determining motion weights of the target component at a plurality of moments using the periodic function; and determining the periodic motion amplitude according to the motion weights of the target component at the plurality of moments and the upper limit of the motion amplitude.

13. The electronic device of claim 12, wherein determining the motion weights of the target component at a plurality of moments using the periodic function comprises:

determining the motion weights of the target component at the plurality of moments using the periodic function according to an image frame number and a frame rate of a sticker to be generated.

14. The electronic device of claim 12, wherein before determining the motion weights of the target component at a plurality of moments using the periodic function, the operations further comprise:

determining the periodic function according to a duration of a sticker to be generated, wherein the periodic function is a sinusoidal function.

15. The electronic device of claim 11, wherein determining the upper limit of the motion amplitude of the target component comprises:

determining the upper limit of the motion amplitude according to the global position, the global position indicating a component size of the target component, and the upper limit of the motion amplitude being directly proportional to the component size.

16. The electronic device of claim 15, wherein determining the upper limit of the motion amplitude according to the global position comprises:

determining the component size according to the global position; and determining the upper limit of the motion amplitude according to the component size and an image size of a sticker to be generated.

17. The electronic device of claim 16, wherein in the generated sticker the target component is in a first motion state, the first motion state comprising a state of left-right swinging, the component size comprising a component height and a component width of the target component, the upper limit of the motion amplitude comprising a maximum amplitude of left-right swinging of the target component, determining the upper limit of the motion amplitude according to the component size and the image size of the sticker comprising:

determining a ratio between the component height and an image height in the image size; and determining the maximum amplitude of left-right swinging of the target component according to the ratio, the component width, and a first scaling parameter.

18. A non-transitory computer readable storage medium, the computer readable storage medium storing a computer executive instruction therein, and implementing operations comprising:

obtaining a material image of a target component on an avatar;

determining a global position of the target component according to the material image;

determining a periodic motion amplitude of the target component, wherein determining the periodic motion amplitude of the target component comprises:

determining an upper limit of a motion amplitude of the target component, and determining the periodic motion amplitude according to a periodic function and the upper limit of the motion amplitude;

generating a sticker according to the material image, the global position, and the periodic motion amplitude, wherein in the generated sticker, the target component is driven to move according to the global position and the periodic motion amplitude.

19. The non-transitory computer readable storage medium of claim 18, wherein determining the periodic motion amplitude of the target component comprises:

determining motion weights of the target component at a plurality of moments using the periodic function; and determining the periodic motion amplitude according to the motion weights of the target component at a plurality of moments and the upper limit of the motion amplitude.

20. The non-transitory computer readable storage medium of claim 18, wherein determining the upper limit of the motion amplitude of the target component comprises:

determining the upper limit of the motion amplitude according to the global position, the global position indicating a component size of the target component, and the upper limit of the motion amplitude being directly proportional to the component size.

* * * * *